United States Patent
Aoki et al.

(10) Patent No.: US 11,322,744 B2
(45) Date of Patent: May 3, 2022

(54) ELECTRODE MIXTURE, METHOD FOR PRODUCING ELECTRODE MIXTURE, ELECTRODE STRUCTURE, METHOD FOR PRODUCING ELECTRODE STRUCTURE, AND SECONDARY BATTERY

(71) Applicant: Kureha Corporation, Tokyo (JP)

(72) Inventors: Kenta Aoki, Tokyo (JP); Shoko Aoki, Tokyo (JP); Shota Kobayashi, Tokyo (JP); Yasuhiro Tada, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 329 days.

(21) Appl. No.: 16/348,216

(22) PCT Filed: Nov. 9, 2017

(86) PCT No.: PCT/JP2017/040409
§ 371 (c)(1),
(2) Date: May 8, 2019

(87) PCT Pub. No.: WO2018/092677
PCT Pub. Date: May 24, 2018

(65) Prior Publication Data
US 2019/0326602 A1     Oct. 24, 2019

(30) Foreign Application Priority Data

Nov. 15, 2016  (JP) .............................. JP2016-222767

(51) Int. Cl.
*H01M 4/62*   (2006.01)
*H01M 4/131*  (2010.01)
(Continued)

(52) U.S. Cl.
CPC ........... *H01M 4/623* (2013.01); *H01M 4/131* (2013.01); *H01M 4/1391* (2013.01);
(Continued)

(58) Field of Classification Search
CPC .... H01M 4/623; H01M 4/131; H01M 4/1391; H01M 4/505; H01M 4/525
See application file for complete search history.

(56) References Cited

U.S. PATENT DOCUMENTS 6,387,570 B1      5/2002  Nakamura et al.
2003/0198870 A1*  10/2003 Wariishi ............ H01M 10/0567
                                              429/313

(Continued)

FOREIGN PATENT DOCUMENTS

CN   1714465 A   12/2005
CN   1838454 A    9/2006
(Continued)

OTHER PUBLICATIONS

Korean Office Action dated Feb. 3, 2021 for Application No. 10-2019-7012164 with an English translation.
(Continued)

*Primary Examiner* — Jonathan G Jelsma
(74) *Attorney, Agent, or Firm* — Birch, Stewart, Kolasch & Birch, LLP

(57) ABSTRACT

To provide an electrode mixture that suppresses gelling of an electrode mixture slurry and maintains a high binding capacity between an electrode active material and a current collector even after an extended period of time has elapsed since an electrode mixture slurry was produced. The electrode mixture includes: a binder composition—containing a first copolymer of vinylidene fluoride and a polar group-containing compound; and a second copolymer of vinylidene fluoride and chlorotrifluoroethylene—; and an electrode active material of lithium oxide having a pH of water when extracted with water of not less than 10.5.

8 Claims, 2 Drawing Sheets

(51) Int. Cl.
*H01M 4/505* (2010.01)
*H01M 4/525* (2010.01)
*H01M 4/1391* (2010.01)
*H01M 4/36* (2006.01)
*H01M 10/0525* (2010.01)
*H01M 4/02* (2006.01)

(52) U.S. Cl.
CPC ........... *H01M 4/366* (2013.01); *H01M 4/505* (2013.01); *H01M 4/525* (2013.01); *H01M 10/0525* (2013.01); *H01M 2004/028* (2013.01)

(56) References Cited

U.S. PATENT DOCUMENTS

| | | | |
|---|---|---|---|
| 2010/0133482 | A1 | 6/2010 | Abusleme et al. |
| 2011/0318638 | A1 | 12/2011 | Koh et al. |
| 2013/0236783 | A1 | 9/2013 | Kose et al. |
| 2013/0273424 | A1 | 10/2013 | Watanabe et al. |
| 2014/0206822 | A1 | 7/2014 | Joo et al. |
| 2015/0200398 | A1* | 7/2015 | Yeou ................ H01M 4/622 429/217 |

FOREIGN PATENT DOCUMENTS

| | | | |
|---|---|---|---|
| CN | 101679563 A | | 3/2010 |
| CN | 102187503 A | | 9/2011 |
| CN | 104725545 A | | 6/2015 |
| JP | H09320607 A | | 12/1997 |
| JP | 11-67274 A | | 3/1999 |
| JP | H11195419 A | | 7/1999 |
| JP | 2007-317534 A | | 12/2007 |
| JP | 2010525124 A | | 7/2010 |
| JP | 2012-174569 A | | 9/2012 |
| JP | 2013235698 A | | 11/2013 |
| JP | 2014007088 A | | 1/2014 |
| JP | 5932471 B2 | | 6/2016 |
| KR | 10-2010-0016468 A | | 2/2010 |
| KR | 10-2011-0060931 A | | 6/2011 |
| KR | 10-2013-0109185 A | | 10/2013 |
| WO | WO 2008/129041 A1 | | 10/2008 |
| WO | WO2010074041 A1 | | 7/2010 |
| WO | WO 2010/092976 A1 | | 8/2010 |
| WO | WO 2012/043765 A1 | | 4/2012 |
| WO | WO2012090876 A1 | | 7/2012 |

OTHER PUBLICATIONS

Extended European Search Report, dated Sep. 23, 2019, for European Application No. 17872096.7.
Korean Office Action dated Aug. 12, 2020 for Application No. 10-2019-7012164 with an English translation.
Japanese Office Action, dated Dec. 22, 2020, for Japanese Application No. 2018-551596, with an English translation.
International Search Report for PCT/JP2017/040409 dated Feb. 6, 2018.
Translation of the International Search Report for PCT/JP2017/040409 dated Feb. 6, 2018.
Written Opinion of the International Searching Authority for PCT/JP2017/040409 dated Feb. 6, 2018.
Japanese Office Action for Japanese Application No. 2018-551596, dated Jun. 2, 2020, with an English translation.
English translation of International Preliminary Report on Patentability and Written Opinion dated May 31, 2019, in PCT/JP2017/040409 (Forms PCT/IB/338, PCT/IB/373, and PCT/ISA/237).
Chinese First Office Action and Search Report (including an English translation thereof) issued in the corresponding Chinese Patent Application No. 201780067246.2 dated Jul. 2, 2021.
Chinese Office Action for Chinese Application No. 201780067246.2, dated Dec. 28, 2021, with English translation.

* cited by examiner

ELECTRODE MIXTURE, METHOD FOR PRODUCING ELECTRODE MIXTURE, ELECTRODE STRUCTURE, METHOD FOR PRODUCING ELECTRODE STRUCTURE, AND SECONDARY BATTERY

TECHNICAL FIELD

The present invention relates to an electrode mixture, and more specifically relates to an electrode mixture for a lithium-ion secondary battery.

BACKGROUND ART

Lithium-ion secondary batteries have a high energy density and therefore are used not only in the power source of portable devices, but also in various settings such as hybrid electric vehicles and electric vehicles.

A lithium ion secondary battery is obtained by applying an electrode mixture slurry onto a current collector and thus forming an electrode mixture layer on the current collector. The electrode mixture slurry is obtained by kneading a powdery electrode forming material of an electrode active material, a conductive auxiliary that is added as necessary, and the like into a binder (binding agent), which binds the electrode active material and the current collector, and dissolving or dispersing the kneaded material in a suitable solvent.

Vinylidene fluoride polymers have been used as binders for lithium-ion secondary batteries in the related art. However, in a case where a vinylidene fluoride polymer is used as a binder, gelling of the slurry often occurs when the electrode mixture slurry is produced. Once the slurry has gelled, even in a case where the electrode mixture is heated or a new solvent is added, only a non-uniform slurry can be obtained.

Therefore, as a method for suppressing the gelling of the electrode mixture slurry, Patent Document 1, for example, discloses a binder composition that includes polyvinylidene fluoride and a copolymer of vinylidene fluoride and chlorotrifluoroethylene as a binder composition for binding an electrode active material and a current collector.

CITATION LIST

Patent Literature

Patent Document 1: JP 2013-235698 A (published Nov. 21, 2013)

SUMMARY OF INVENTION

Technical Problem

However, with the binder composition disclosed in Patent Document 1, although it is thought that gelling of the electrode mixture slurry can be suppressed, the binding capacity between the electrode active material and the current collector (for example, aluminum foil) with the binder composition is insufficient, resulting in a problem of a tendency for the electrode active material to separate from the current collector.

In addition, in the actual process of producing an electrode for a lithium ion secondary battery, an electrode mixture slurry is produced, and it may take a certain amount of time to coat the slurry onto the entire current collector. Therefore, a demand exists for a binder composition that maintains a high binding capacity between the electrode active material and the current collector even after an extended period of time has elapsed since the electrode mixture slurry was produced.

The present invention was conceived in light of the above-mentioned problems, and an object of the present invention is to provide an electrode mixture that suppresses gelling of the electrode mixture slurry and maintains a high binding capacity between the electrode active material and the current collector even after an extended period of time has elapsed since the electrode mixture slurry was produced.

Solution to Problem

In order to solve the problems described above, an electrode mixture according to the present invention includes: an electrode active material provided on a current collector; and a binder composition for binding the electrode active material to the current collector, wherein the binder composition includes a first copolymer of vinylidene fluoride and a polar group-containing compound; and a second copolymer of vinylidene fluoride and chlorotrifluoroethylene, the electrode active material includes a lithium metal oxide, and the pH of water when the lithium metal oxide is extracted with water is not less than 10.5.

A method for producing an electrode mixture according to the present invention includes kneading: a first copolymer obtained by copolymerizing vinylidene fluoride and a polar group-containing compound; a second copolymer obtained by copolymerizing vinylidene fluoride and chlorotrifluoroethylene; and a lithium metal oxide, wherein the pH of water when the lithium metal oxide is extracted with water is not less than 10.5.

An electrode structure according to the present invention includes a current collector; and an electrode mixture layer provided on the current collector, wherein the electrode mixture layer includes at least a binder composition and an electrode active material, the binder composition includes a first copolymer of vinylidene fluoride and a polar group-containing compound; and a second copolymer of vinylidene fluoride and chlorotrifluoroethylene, the electrode active material includes a lithium metal oxide, and the pH of water when the electrode mixture layer is extracted with water is not less than 10.5.

A method for producing an electrode structure according to the present invention includes: applying and drying an electrode mixture including a vinylidene fluoride copolymer, a lithium metal oxide, and a solvent onto a surface of a current collector to form a coating film on the surface of the current collector; and heat treating the coating film to obtain an electrode mixture layer, wherein the vinylidene fluoride copolymer includes a first copolymer of vinylidene fluoride and a polar group-containing compound; and a second copolymer of vinylidene fluoride and chlorotrifluoroethylene, and the pH of water when the electrode mixture layer is extracted with water is not less than 10.5.

Advantageous Effects of Invention

According to the electrode mixture of the present invention, gelling of the electrode mixture slurry is suppressed, and a high binding capacity between the electrode active material and the current collector can be maintained even after an extended period of time has passed since the electrode mixture slurry was produced.

DESCRIPTION OF EMBODIMENTS

Electrode Mixture

Figure 1:
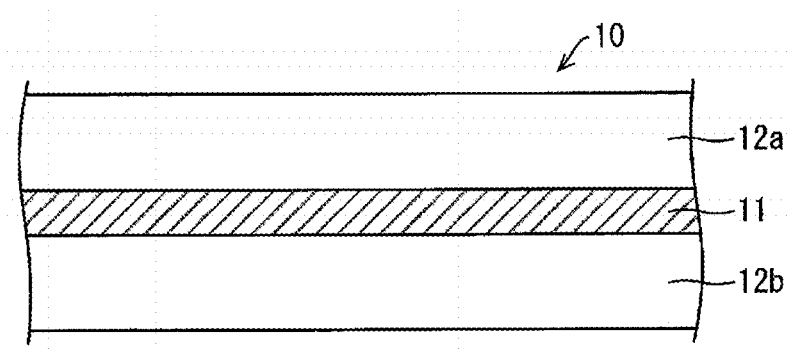
FIG. 1 is a cross-sectional view of an electrode structure according to an embodiment of the present invention.

The electrode mixture of an embodiment of the present invention contains: an electrode active material provided on a current collector; and a binder composition for binding the electrode active material to the current collector, wherein the binder composition includes a first copolymer of vinylidene fluoride and a polar group-containing compound; and a second copolymer of vinylidene fluoride and chlorotrifluoroethylene, the electrode active material includes a lithium metal oxide, and the pH of water when the lithium metal oxide is extracted with water is not less than 10.5.

Hereinafter, an embodiment of the present invention will be described in detail.

Binder Composition

The binder composition of an embodiment of the present invention is used as a binding agent for binding an electrode active material onto a current collector.

As described above, the binder composition according to an embodiment of the present invention includes a first copolymer and a second copolymer. Each of the first and second copolymers will be described in detail below.

First Copolymer

The first copolymer used in an embodiment of the present invention is a copolymer of vinylidene fluoride and a polar group-containing compound.

The polar group-containing compound in the first copolymer is, for example, a compound containing a polar group such as a carboxyl group, an epoxy group, a hydroxyl group, and a sulfonic acid group. In an embodiment of the present invention, the polar group-containing compound is preferably a compound containing a carboxyl group. The inclusion of carboxyl groups in the polar group-containing compound is preferable from the perspective of obtaining a good binding capacity between the electrode active material and the current collector or between electrode active materials.

Of the polar group-containing compounds, examples of the compound having a carboxyl group include unsaturated monobasic acids, unsaturated dibasic acids, and unsaturated dibasic acid monoesters. More specifically, examples include acrylic acid (AA), 2-carboxyethyl acrylate (CEA), 2-carboxyethyl methacrylate, acryloyloxy ethyl succinate (AES), acryloyloxy propyl succinate (APS), and other acrylic acid derivatives; monomethyl maleate (MMM); and monoethyl maleate.

Among the polar group-containing compounds, examples of the compound including an epoxy group include acrylic glycidyl ether, allyl glycidyl ether, glycidyl crotonate, and glycidyl allyl acetate. Furthermore, examples of the compound including a hydroxyl group include hydroxyl ethyl acrylate and hydroxypropyl acrylate.

The first copolymer preferably includes from 90.00 to 99.99 mol %, more preferably from 93.00 to 99.98 mol %, and particularly preferably from 96.00 to 99.97 mol %, of vinylidene fluoride units. This range is preferable from the perspective of good binding capacity between the electrode active material and the current collector or between electrode active materials. Note that in the present specification, the term "vinylidene fluoride unit" refers to a structural unit derived from vinylidene fluoride. In addition, in the present embodiment, the total of the vinylidene fluoride units, that is, the structural units derived from vinylidene fluoride, and structural units derived from the polar group-containing compound is considered to be 100.00 mol %.

Note that the amount of vinylidene fluoride units in the first copolymer can typically be determined by the $^1$H NMR spectrum of the first copolymer or by neutralization titration.

The first copolymer may also include, as a structural unit, a component of another compound besides the vinylidene fluoride and polar group-containing compound. Examples of the other compound include vinyl fluoride, trifluoroethylene, chlorotrifluoroethylene, tetrafluoroethylene, hexafluoropropylene, and perfluoromethyl vinyl ether.

In a case where the first copolymer includes another compound unit described above, the first copolymer preferably includes from 0.01 to 10 mol % of the other compound unit based on the amount of all compound (monomer) units constituting the first copolymer being 100 mol %.

The first copolymer used in an embodiment of the present invention has an inherent viscosity (logarithmic viscosity at 30° C. of a solution obtained by dissolving 4 g of resin in 1 liter of N,N-dimethylformamide; same hereinafter) of preferably from 0.3 to 5.0 dL/g, more preferably from 0.5 to 4.5 dL/g, and particularly preferably from 0.8 to 4.0 dL/g.

The first copolymer used in an embodiment of the present invention is obtained by copolymerizing vinylidene fluoride and a polar group-containing compound; and as necessary, the other compound described above.

The method of copolymerizing the first copolymer is not particularly limited, and for example, a method such as suspension polymerization, emulsion polymerization, and solution polymerization can be used. Among these, from the perspective of the ease of post-treatment and the like, the polymerization method is preferably a suspension polymerization or emulsion polymerization of a water-based system. In addition, the vinylidene fluoride and polar group-containing compound used in copolymerization are each already known compounds, and common commercially available products may be used.

The first copolymer used in an embodiment of the present invention is typically obtained by copolymerizing from 90.00 to 99.99 parts by weight of vinylidene fluoride and from 0.01 to 10.00 parts by weight of a polar group-containing compound; and preferably from 95.00 to 99.99 parts by weight of vinylidene fluoride and from 0.01 to 5.00 parts by weight of the polar group-containing compound (provided that the total of vinylidene fluoride and polar group-containing compound is 100 parts by weight).

Second Copolymer

The second copolymer used in an embodiment of the present invention is a copolymer of vinylidene fluoride and chlorotrifluoroethylene.

The second copolymer preferably includes from 70.00 to 99.50 mol % and more preferably from 85.00 to 99.00 mol % of vinylidene fluoride units. So far, this is based on the total of the vinylidene fluoride units and chlorotrifluoroethylene being 100.00 mol %.

The amount of the vinylidene fluoride unit of the second copolymer can typically be determined by the $^1$H NMR spectrum of the second copolymer or by neutralization titration.

The second copolymer may include another compound unit besides the vinylidene fluoride and chlorotrifluoroethylene. Examples of the other compound include fluorine monomers such as vinylene fluoride, trifluoroethylene, tetrafluoroethylene, hexafluoropropylene, and fluoroalkyl vinyl ethers; or epoxy group-containing vinyl monomers such as allyl glycidyl ether and glycidyl crotonate. Furthermore, in order to further improve the binding capacity between the electrode active material and the current collector or between electrode active materials, the second copolymer may include an unsaturated monobasic acid, unsaturated dibasic acid, or unsaturated dibasic acid monoester, and more specific examples include acrylic acid (AA), 2-carboxyethyl acrylate (CEA), 2-carboxyethyl methacrylate, acryloyloxy ethyl succinate (AES), acryloyloxy propyl succinate (APS), and other acrylic acid derivatives; monomethyl maleate (MMM); and monoethyl maleate.

In a case where the second copolymer includes another compound unit described above, the second copolymer preferably includes from 0.01 to 10 mol % of the other compound unit based on the amount of all compound (monomer) units constituting the second copolymer being 100 mol %.

The second copolymer used in an embodiment of the present invention has an inherent viscosity of preferably from 0.3 to 5.0 dL/g, more preferably from 0.5 to 4.5 dL/g, and particularly preferably from 0.8 to 4.0 dL/g.

The second copolymer used in an embodiment of the present invention is obtained by copolymerizing the vinylidene fluoride and chlorotrifluoroethylene; and as necessary, the other compound described above.

The method for copolymerizing the second copolymer is not particularly limited, and the above-described methods given as polymerization methods for the first copolymer can be used. In addition, the vinylidene fluoride and chlorotrifluoroethylene used in the second copolymer are each already known compounds, and common commercial products can be used.

The second copolymer used in an embodiment of the present invention is typically obtained by copolymerizing from 90.00 to 99.50 parts by weight of vinylidene fluoride and from 0.05 to 10.00 parts by weight of chlorotrifluoroethylene; and preferably from 92.00 to 98.50 parts by weight of vinylidene fluoride and from 1.50 to 8.00 parts by weight of chlorotrifluoroethylene (provided that the total of the vinylidene fluoride and chlorotrifluoroethylene is 100 parts by weight).

Compounding Ratio

In the electrode mixture of an embodiment of the present invention, the compounding ratio of the first copolymer and the second copolymer included in the binder composition is preferably from 25:75 to 95:5, more preferably from 30:70 to 90:10, and even more preferably from 35:65 to 85:15 in terms of a mass ratio. This range is preferable because in this range, the effect of suppressing gelling of the electrode mixture slurry, the binding capacity between the electrode active material and the current collector with the binder composition, and the binding stability are respectively improved.

For example, in a case where the binder composition is 100 parts by weight, when the first copolymer is from 25 to 95 parts by weight, the binder composition exhibits a high binding capacity between the electrode active material and the current collector. In addition, when the second copolymer is from 5 to 75 parts by weight, gelling of the electrode mixture slurry can be suitably suppressed, and therefore when a below-described electrode structure is produced using such an electrode mixture, productivity of the electrode structure is improved.

Electrode Active Material

The electrode active material used in an embodiment of the present invention includes a lithium metal oxide. Note that in the present embodiment, the electrode active material may also include, for example, impurities, and additives in addition to the lithium metal oxide. Moreover, the types of impurities, additives, and the like included in the electrode active material are not particularly limited. When the lithium metal oxide of an embodiment of the present invention is extracted at ordinary temperature (25° C.) by an extraction method defined by JIS K 5101-16-2, the pH of the water is at least not less than 10.5.

More specifically, the pH value is obtained by adding an electrode active material to ultrapure water of an amount that is 50 times the weight of the electrode active material, stirring the solution for 10 minutes using a magnetic stirrer with a rotation speed of 600 rpm, and then measuring the pH of the solution by using a pH meter MODEL: F-21 available from Horiba Ltd.

When the pH of the water is at least not less than 10.5, the capacity of the secondary battery can be increased, and thus such a pH level is preferable. Note that the pH of the water is not particularly limited.

The electrode active material used in an embodiment of the present invention may be a lithium metal oxide that satisfies the pH condition described above, and examples of such a lithium metal oxide include lithium metal oxide represented by Formula (1).

$$LiMO_2 \quad (1)$$

In Formula (1) above, M is more preferably at least one type of transition metal selected from the group consisting of Ni, Co, Al, Fe, Mn, Cr, and V; M is more preferably Ni, Co, or Al, and M more preferably includes one or more transition metals selected from the group consisting of Co, Mn, and Al in addition to Ni. The inclusion of Ni in the lithium metal oxide is preferable in that the capacity of the secondary battery can be increased by increasing the capacitance density. Furthermore, the inclusion of Co and the like in the lithium metal oxide in addition to Ni is preferable because changes in the crystal structure during the charging and discharging process are prevented, and thereby stable cycle characteristics are exhibited.

Specific preferable examples of such a lithium metal oxide include $LiCoO_2$ and $LiNiO_2$.

A particularly preferable lithium oxide used in an embodiment of the present invention include a binary lithium metal oxide represented by Formula (2):

$$LiNi_xN1_yO_2 \quad (2)$$

where N1 represents Co or Mn, $0<x\leq1$, and $0<y\leq1$, or a ternary lithium metal oxide represented by Formula (3):

$$LiNi_xCo_yN2_zO_2 \quad (3)$$

where N2 represents Mn or Al, $0<x\leq1$, $0<y\leq1$, and $0<z\leq1$, and spinel-type $LiMn_2O_4$.

With the lithium metal oxide represented by Formula (2) or (3) above, when the total number of elements constituted by Ni and N1; or Ni, Co and N2 is considered to be 100 mol %, the proportion of Ni is preferably not less than 30 mol %, and more preferably not less than 50 mol %.

A ternary lithium metal oxide has a high charging potential and excellent cycle characteristics, and thus a ternary lithium metal oxide is particularly preferably used as the electrode active material of an embodiment of the present invention.

The composition of the binary lithium metal oxide used in an embodiment of the present invention is not particularly limited, and examples of the composition thereof include $Li_{1.0}Ni_{0.8}Co_{0.2}O_2$ and $Li_{1.0}Ni_{0.5}Mn_{0.5}O_2$.

Furthermore, the composition of the ternary lithium metal oxide used in an embodiment of the present invention is not particularly limited, and examples of the composition thereof include $Li_{1.00}Ni_{0.35}Co_{0.34}Mn_{0.34}O_2$ (NCM111), $Li_{1.00}Ni_{0.52}Co_{0.20}Mn_{0.30}O_2$ (NCM523), $Li_{1.00}Ni_{0.50}Co_{0.30}Mn_{0.20}O_2$ (NCM532), $Li_{1.00}Ni_{0.6}Co_{0.2}Mn_{0.2}O_2$ (NCM622), $Li_{1.00}Ni_{0.83}Co_{0.12}Mn_{0.05}O_2$ (NCM811), and $Li_{1.00}Ni_{0.85}Co_{0.15}Al_{0.05}O_2$ (NCA811).

Furthermore, the electrode active material used in an embodiment of the present invention may include a plurality of different types of lithium metal oxides and, for example, may include a plurality of $LiNi_xCo_yMn_zO_2$ of different compositions or may include $LiNi_xCo_yMn_zO_2$ and $LiNi_xCo_yAl_zO_2$.

Solvent

The binder composition used in an embodiment of the present invention may include a solvent. The solvent can be water or a non-aqueous solvent. Examples of the non-aqueous solvent include N-methyl-2-pyrrolidone (also called "NMP" hereafter), dimethylformamide, N-dimethylformamide, N,N-dimethylacetamide, dimethyl sulfoxide, N,N-dimethyl sulfoxide, hexamethylphosphoramide, dioxane, tetramethylurea, triethyl phosphate, trimethyl phosphate, acetone, cyclohexanone, methyl ethyl ketone, and tetrahydrofuran. One or more types of these solvents may be included in the binder composition.

The content of the solvent in the binder composition is, for example, preferably from 400 to 10000 parts by weight and more preferably from 600 to 5000 parts by weight when the binder composition is considered to be 100 parts by weight. When the content is in such a range, an appropriate solution viscosity is obtained along with excellent handling properties, and thus such a content is preferable.

Other Components

The binder composition of an embodiment of the present invention may include other components as necessary. Examples of the other components include conductive auxiliaries and pigment dispersants such as those described below.

Conductive auxiliary

A conductive auxiliary is added for the purpose of improving the conductivity of a below-described electrode mixture layer. Examples of the conductive auxiliary include graphites such as natural graphite (scaly graphite, etc.), artificial graphite, fine graphite powder, and graphite fiber; carbon blacks such as acetylene black, Ketjen black, channel black, and furnace black; and carbon materials such as carbon fibers and carbon nanotubes. Other examples include conductive fibers such as metal fibers of Ni, Al and the like; metal powders; conductive metal oxides; and organic conductive materials.

Pigment Dispersant

Examples of the pigment dispersant include polyvinylpyrrolidone.

The binder composition of an embodiment of the present invention ordinarily includes the other components described above at an amount of from 0 to 10 parts by weight and preferably from 0 to 5 parts by weight per 100 parts by weight of the binder composition of an embodiment of the present invention.

Slurry Viscosity of Electrode Mixture

In a case where the electrode mixture of an embodiment of the present invention is used, it is possible to determine, through the slurry viscosity of the electrode mixture, to what extent gelling of the electrode mixture slurry can be suppressed. Note that in the present specification, "gelling" indicates a state in which the electrode mixture slurry does not become a uniform paste-like mixture and a slurry in which solid material is present cannot be measured when, for example, the electrode mixture slurry is stored for 96 hours at 40° C. in a nitrogen atmosphere, and then subsequently stirred for 30 seconds using a mixer (for example, the Awatori Rentaro ARE310 (rotational speed of 800 rpm, orbital speed of 2000 rpm) available from Thinky Corporation). Note that solid material refers to substances that remain on top of a mesh after the slurry is passed through a mesh having an aperture of 2.36 mm and then left to stand for one hour.

The slurry viscosity of the electrode mixture of an embodiment of the present invention is preferably from 2000 to 50000 mPa·s, and more preferably from 5000 to 30000 mPa·s when measured using an E-type viscometer at 25° C. and a shear rate of 2 $s^{-1}$. The slurry viscosity is preferably within this range from the perspective of being able to suitably suppress gelling of the electrode mixture of an embodiment of the present invention and to form the electrode mixture into a uniform paste-like state. In addition, such a range is also preferable in that when the slurry viscosity is in this range, electrodes are easily produced without the occurrence of: a reduction in production volume due to a reduction in slurry solids; and uneven thickness of the electrode when the electrode mixture is applied.

Method for Producing Electrode Mixture

Next, a method for producing the electrode mixture of an embodiment of the present invention will be described. As described above, the method for producing the electrode mixture of an embodiment of the present invention includes kneading a first copolymer obtained by copolymerizing vinylidene fluoride and a polar group-containing composition; a second copolymer obtained by copolymerizing vinylidene fluoride and chlorotrifluoroethylene; and the lithium metal oxide described above. In the method for producing an electrode mixture of an embodiment of the present invention, solvents and other components may be kneaded as necessary, and the method is not particularly limited. Furthermore, the order in which the various components are added when kneading is not particularly limited. Moreover, in a case where the solvent is added, the electrode active material and the solvent may be stirred and mixed in advance, and then the first and second copolymers may be added.

Electrode Structure

Next, an embodiment of an electrode structure formed using the electrode mixture of an embodiment of the present invention will be described with reference to FIG. 1. FIG. 1 is a cross-sectional view of an electrode structure according to an embodiment of the present invention.

As illustrated in FIG. 1, an electrode structure 10 includes a current collector 11, and electrode mixture layers 12a and 12b.

The current collector 11 is a substrate of the electrode structure 10 and is a terminal for producing electricity. Examples of materials for the current collector 11 include iron, stainless steel, steel, aluminum, nickel, and titanium. The shape of the current collector 11 is preferably a foil or a mesh. In an embodiment of the present invention, the current collector 11 is preferably an aluminum foil.

The thickness of the current collector 11 is preferably from 5 to 100 μm and more preferably from 5 to 20 μm.

The electrode mixture layers 12a and 12b are layers including the electrode mixture of an embodiment of the present invention and are formed using the electrode mixture of an embodiment of the present invention as described in detail below. The thickness of the electrode mixture layers 12a and 12b is from 10 μm to 1000 μm, more preferably from 20 to 250 μm, and even more preferably from 20 to 150 μm.

When the electrode mixture layer of an embodiment of the present invention is extracted at ordinary temperature (25° C.) by an extraction method defined by JIS K 5101-16-2, the pH of the water is not less than 10.5. More specifically, the pH is measured by the method described in the electrode active material section with the exception that the electrode mixture layer is peeled from the current collector foil, and this is then used as a sample.

Note that the electrode structure 10 includes the electrode mixture layers 12a, 12b formed on the upper and lower surfaces of the current collector 11 as illustrated in FIG. 1, but the electrode structure 10 is not limited thereto and may be an electrode structure in which an electrode mixture layer is formed on only one side of either side of the current collector 11, that is, an electrode structure in which the electrode mixture layer 12a or 12b is formed.

The electrode structure 10 of an embodiment of the present invention can be used, for example, as a positive electrode of a lithium secondary battery described below.

Method for Producing Electrode Structure

The method for producing the electrode structure of an embodiment of the present invention will be described with reference once again to FIG. 1.

The method for producing an electrode structure of an embodiment of the present invention is a method that uses the electrode mixture of an embodiment of the present invention. More specifically, the method includes applying and drying the electrode mixture of an embodiment of the present invention in a slurry state (hereinafter, also referred to as an "electrode mixture slurry") including: a vinylidene fluoride copolymer including the first copolymer and the second copolymer described above; a lithium metal oxide; and a solvent, onto the surface of the current collector 11 to form a coating film on the surface of the current collector 11; and heat treating the coating film. This provides the electrode structure 10 with the electrode mixture layers 12a and 12b formed on the upper and lower surfaces of the current collector 11.

With the method for producing the electrode structure of an embodiment of the present invention, a known method can be used as the method for applying the electrode mixture slurry, and examples include a bar coater, a die coater, or a comma coater.

The drying temperature when drying the electrode mixture slurry applied to the upper and lower surfaces of the current collector 11 can be from 50 to 170° C. and preferably from 50 to 150° C.

Note that in the present embodiment, a method of forming the electrode mixture layer by applying the electrode mixture slurry onto the upper and lower surfaces of the current collector was described. However, the method for producing the electrode of an embodiment of the present invention is not limited thereto, and the electrode mixture of an embodiment of the present invention may be applied to at least one side of the current collector.

Peel strength

In the present specification, the peel strength refers to the peel strength that is obtained when a one-side coated electrode with a one-side basis weight of 200 g/m² according to the electrode structure of an embodiment of the present invention is cut to a length of 50 mm and width of 20 mm, and a 90 degree peel test is conducted at a head speed of 10 mm/minute in accordance with JIS K-6854 using a tensile tester ("STA-1150 Universal Testing Machine" available from Orientec Co., Ltd.). In an embodiment of the present invention, the peel strength indicates the binding capacity between the binder composition and the current collector, and a higher peel strength indicates a higher binding capacity between the electrode active material and the current collector with the binder composition. The obtained electrode structure of an embodiment of the present invention preferably maintains sufficient peel strength even when the electrode structure is produced as described above after a certain amount of time, for example, 24 hours or 96 hours, has elapsed since the electrode mixture slurry was prepared.

Secondary Battery

Figure 2:
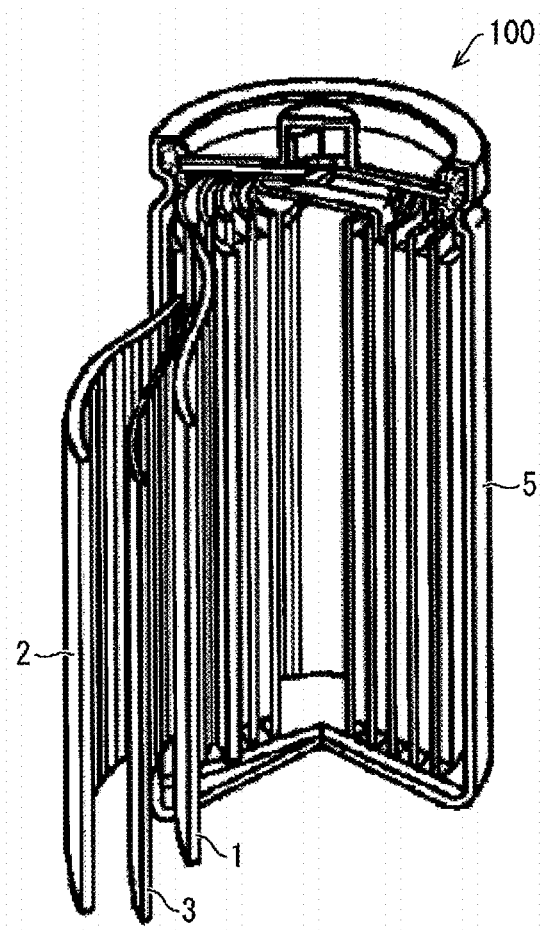
FIG. 2 is an exploded perspective view of a secondary battery according to an embodiment of the present invention.

The secondary battery of an embodiment of the present invention is a non-aqueous electrolyte secondary battery including the electrode structure of an embodiment of the present invention. An embodiment of the secondary battery of the present invention will be described with reference to FIG. 2. FIG. 2 is an exploded perspective view of a secondary battery according to the present embodiment.

As illustrated in FIG. 2, a secondary battery 100 has a structure in which an electricity-generating element, obtained by disposing and stacking a separator 3 between a positive electrode 1 and a negative electrode 2, and then winding the laminate structure into a spiral shape, is housed in a metal casing 5. The positive electrode 1 corresponds to the electrode structure 10 of FIG. 1.

A known material such as a porous film of a polymeric material such as polypropylene or polyethylene may be used as the separator 3. In addition, as the members used in the secondary battery 100, those members which are ordinarily used in the present field can be used as appropriate.

The secondary battery 100 is a cylindrical battery, but of course the secondary battery 100 of an embodiment of the present invention is not limited thereto and, for example, may be a secondary battery having another shape such as a coin shape, a square shape, or a paper shape.

Summary

The electrode mixture according to an embodiment of the present invention contains: an electrode active material provided on a current collector; and a binder composition for binding the electrode active material to the current collector, wherein the binder composition includes: a first copolymer of vinylidene fluoride and a polar group-containing compound; and a second copolymer of vinylidene fluoride and chlorotrifluoroethylene, the electrode active material includes a lithium metal oxide, and the pH of water when the lithium metal oxide is extracted with water is not less than 10.5.

With the electrode mixture according to an embodiment of the present invention, preferably, the first copolymer includes from 90.00 to 99.99 mol % of vinylidene fluoride units, and the second copolymer includes from 70.00 to 99.50 mol % of vinylidene fluoride units (based on the total of the vinylidene fluoride units; and constituent units derived from the polar group-containing compound or the chlorotrifluoroethylene being 100.00 mol %).

In the electrode mixture according to an embodiment of the present invention, the lithium metal oxide is preferably represented by Formula (1):

$$LiMO_2 \qquad (1)$$

where M represents at least one type selected from the group consisting of Ni, Co, Al, Fe, Mn, Cr, and V.

In the electrode mixture according an embodiment of the present invention, preferably, the lithium metal oxide is a binary lithium metal oxide represented by Formula (2):

$$LiNi_xN1_yO_2 \quad (2)$$

where N1 represents Co or Mn, $0<x\leq1$, and $0<y\leq1$, or a ternary lithium metal oxide represented by Formula (3):

$$LiNi_xCo_yN2_zO_2 \quad (3)$$

where N2 represents either Mn or Al, $0<x\leq1$, $0<y\leq1$, and $0<z\leq1$.

In the electrode mixture according to an embodiment of the present invention, preferably, the polar group-containing compound contains a carboxyl group.

In the electrode mixture according to an embodiment of the present invention, preferably, the polar group-containing compound is an acrylic acid, an acrylic acid derivative, or an unsaturated dibasic acid monoester.

In the electrode mixture according to an embodiment of the present invention, preferably, the compounding ratio of the first copolymer and the second copolymer included in the binder composition is from 95:5 to 25:75 in terms of a mass ratio.

The method for producing an electrode mixture according to an embodiment of the present invention includes kneading: a first copolymer obtained by copolymerizing vinylidene fluoride and a polar group-containing compound; a second copolymer obtained by copolymerizing vinylidene fluoride and chlorotrifluoroethylene; and a lithium metal oxide, wherein the pH of water when the lithium metal oxide is extracted with water is not less than 10.5.

The electrode structure according to an embodiment of the present invention is an electrode structure including a current collector; and an electrode mixture layer provided on the current collector, wherein the electrode mixture layer includes at least a binder composition and an electrode active material, the binder composition includes a first copolymer of vinylidene fluoride and a polar group-containing compound; and a second copolymer of vinylidene fluoride and chlorotrifluoroethylene, the electrode active material includes a lithium metal oxide, and the pH of water when the electrode mixture layer is extracted with water is not less than 10.5.

The method for producing an electrode structure according to an embodiment of the present invention includes: applying and drying an electrode mixture including a vinylidene fluoride copolymer, a lithium metal oxide, and a solvent onto a surface of a current collector to form a coating film on the surface of the current collector; and heat treating the coating film to obtain an electrode mixture layer, wherein the vinylidene fluoride copolymer includes a first copolymer of vinylidene fluoride and a polar group-containing compound; and a second copolymer of vinylidene fluoride and chlorotrifluoroethylene, and the pH of water when the electrode mixture layer is extracted with water is not less than 10.5.

The secondary battery according to an embodiment of the present invention includes an electrode structure described in an embodiment of the present invention.

Embodiments of the present invention will be described in further detail hereinafter with the presentation of examples. The present invention is of course not limited to the examples below, and it goes without saying that various aspects are possible with regard to the details thereof. Furthermore, the present invention is not limited to the embodiments described above, and various modifications are possible within the scope indicated in the claims. Embodiments obtained by appropriately combining the respectively disclosed technical means are also included in the technical scope of the present invention. In addition, all of the documents disclosed in the present specification are herein incorporated by reference.

EXAMPLES

As described below, electrode structures were produced using various binder compositions, and peel tests were performed. Prior to describing the specific examples, each of the methods used to calculate the pH of the electrode active material, calculate the slurry viscosity, and measure the viscosity increase change rate (also referred to simply as the viscosity increase rate) will be described.

Measuring pH of Electrode Active Material

The pH of the electrode active material was set as the pH of water when the electrode active material was extracted with water at ordinary temperature (25° C.). Extraction of the electrode active material into water was performed by an extraction method defined by JIS K 5101-16-2. More specifically, the electrode active material was added to ultrapure water of an amount that was 50 times the weight of the electrode active material, and stirred the mixture for 10 minutes using a magnetic stirrer with a rotation speed of 600 rpm, and then the pH of the solution thereof was measured using a pH meter MODEL: F-21 available from Horiba Ltd.

Calculating Inherent Viscosity

To calculate the inherent viscosity $\eta_i$, a polymer solution was produced by dissolving 80 mg of a polymer in 20 mL of N,N-dimethylformamide. The viscosity $\eta$ of this polymer solution was measured using an Ubbelohde viscometer in a constant-temperature bath at 30° C. The inherent viscosity $\eta_i$ was then determined by the following equation using the viscosity $\eta$.

$$\eta_i = (1/C) \cdot \ln(\eta/\eta_0)$$

Here, $\eta_0$ is the viscosity of the solvent N,N-dimethylformamide, and C is 0.4 g/dL.

Calculating Slurry Viscosity

The slurry viscosity of the electrode mixture of the present invention was measured by an E-type viscometer at 25° C. with a shear rate of 2 s$^{-1}$. Note that the viscosity was measured by charging the slurry into a measuring device, waiting for 60 seconds, and then rotating the rotor. In addition, a value obtained after 300 seconds from the startup of rotation of the rotor was used as the slurry viscosity. The viscosity increase change rate was calculated as a percentage by dividing the slurry viscosity after standing for a predetermined amount of time (24 hours or 96 hours) in a nitrogen atmosphere at 40° C. by the slurry viscosity before standing for the predetermined amount of time (at 0 hours).

Measuring Peel Strength

A one side-coated electrode with a one-side basis weight of 200 g/m² was cut to a length of 50 mm and width of 20 mm, and a 90 degree peel test was conducted at a head speed of 10 mm/minute in accordance with JIS K-6854 using a tensile tester ("STA-1150 Universal Testing Machine" available from Orientec Co., Ltd.) to measure the peel strength.

The peel strength was measured by the following method using a slurry for which a certain amount of time had elapsed. The slurry was left to stand in a nitrogen atmosphere at 40° C. for 0, 24, and 96 hours. After the slurry was left to stand, electrodes were fabricated, and the peel strength was measured in a similar manner. The peel strength change rate was calculated as a percentage by dividing the peel strength of the electrode fabricated from the slurry after standing for a predetermined amount of time (24 hours or 96 hours) by the peel strength of the electrode fabricated from the slurry before standing for the predetermined amount of time (at 0 hours).

Constituent Unit Amounts of Vinylidene Fluoride and Comonomer

The $^1$H NMR spectrum of the polymer powder was determined under the following conditions.

Instrument: AVANCE AC 400FT NMR spectrometer available from Bruker Corp.

Measurement Conditions

Frequency: 400 MHz

Measurement solvent: DMSO-$d_6$

Measurement temperature: 25° C.

The amount of constituent units derived from the vinylidene fluoride of the polymer; and the amount of constituent units derived from the polar group-containing compound were calculated from the $^1$H NMR spectrum. Specifically, the amounts of the constituent units were calculated on the basis of an integrated intensity of a signal derived mainly from the polar group-containing compound and signals at 2.24 ppm and 2.87 ppm derived mainly from vinylidene fluoride.

In a case where the polar group-containing compound included constituent units derived from acrylic acid, the amount of constituent units derived from acrylic acid of the polymer was determined by neutralization titration using 0.03 mol/L of a sodium hydroxide aqueous solution. More specifically, a solution to be titrated was prepared by dissolving 0.3 g of the polymer in 9.7 g of acetone at approximately 80° C. and then adding 3 g of pure water. Phenolphthalein was used as an indicator, and neutralization titration was performed at room temperature using a 0.03 mol/L sodium hydroxide aqueous solution.

Example 1

Preparation of VDF/APS Copolymer

Amounts of 1096 g of ion-exchanged water, 0.2 g of Metolose 90SH-100 (available from Shin-Etsu Chemical Co., Ltd.), 2.2 g of a 50 wt. % diisopropyl peroxy dicarbonate-freon 225 cb solution, 426 g of vinylidene fluoride, and an initial addition amount of 0.2 g of acryloyloxy propyl succinate were charged in an autoclave with an internal volume of 2 liters, and the temperature was increased to 26° C. over a period of 1 hour. Subsequently, a 6 wt. % acryloyloxy propyl succinate aqueous solution was gradually added at a rate of 0.5 g/minute while the temperature was maintained at 26° C. The obtained polymer slurry was dehydrated and dried to obtain a vinylidene fluoride copolymer (VDF/APS copolymer) including a polar group. A total of 4.0 g of acryloyloxy propyl succinate was added, including the amount added initially.

Preparation of VDF/CTFE Copolymer

Amounts of 1040 g of ion-exchanged water, 0.4 g of methyl cellulose, 1.6 g of diisopropyl peroxy dicarbonate, 2 g of ethyl acetate, 372 g of vinylidene fluoride, and 28 g of chlorotrifluoroethylene were charged into an autoclave with an internal volume of 2 liters, and suspension polymerization was performed at 28° C. After polymerization was completed, the polymer slurry was dehydrated, the dehydrated polymer slurry was washed with water, and the polymer slurry was once again dehydrated, after which the mixture was dried for 20 hours at 80° C. to obtain a vinylidene fluoride copolymer (VDF/CTFE copolymer) containing chlorine atoms.

Preparation of Binder Solution

NMP was added to the VDF/APS copolymer of the first copolymer and the VDF/CTFE copolymer of the second copolymer to produce a 6% binder solution.

Preparation of Electrode Mixture

The above-mentioned 6% binder solution was added to an electrode active material (NCA811) and carbon black (SP; SuperP (trade name) available from Timcal Japan KK, average particle size of 40 nm, specific surface area of 60 m$^2$/g) as a conductive auxiliary, and primary kneading was performed for 1 minute using a mixer (Awatori Rentaro ARE310, rotational speed of 800 rpm, orbital speed of 2000 rpm, available from Thinky Corporation).

Furthermore, NMP (solid content concentration ((electrode active material+binder+conductive auxiliary)/(electrode active material+binder+conductive auxiliary+NMP))× 100=75%) was added thereto, the mixture was again subjected to secondary kneading for 5 minutes using the mixer, and an electrode mixture was obtained.

The composition of this binder composition was 90 wt. % of the first copolymer and 10 wt. % of the second copolymer. Furthermore, in a case where the mass of the electrode active material was considered to be 100 parts, the mass of the binder composition was 2 parts. In addition, when the mass of the electrode active material was considered to be 100 parts, the mass of the conductive auxiliary was 2 parts.

Production of Electrode

The electrode mixture obtained as described above was applied onto an aluminum foil having a thickness of 15 μm with a bar coater, and the thickness of the electrode mixture was approximately 90 μm. The electrode mixture was dried at 110° C. for 30 minutes, after which the electrode mixture was further dried at 130° C. for 2 hours to obtain a positive electrode.

Example 2

A positive electrode was obtained in the same manner as in Example 1 with the exception that, with respect to the electrode mixture, the amount of the first copolymer was set to 75 wt. %, and the amount of the second copolymer was set to 25 wt. %.

Example 3

A positive electrode was obtained in the same manner as in Example 1 with the exception that, with respect to the electrode mixture, the amount of the first copolymer was set to 50 wt. %, and the amount of the second copolymer was set to 50 wt. %.

Example 4

Amounts of 900 g of ion-exchanged water, 0.4 g of hydroxypropyl methylcellulose, 2 g of butyl peroxypivalate, 396 g of vinylidene fluoride, and an initial addition amount of 0.2 g of acrylic acid were charged in an autoclave with an internal volume of 2 liters, and the mixture was heated to 50° C. A 1 wt. % acrylic acid aqueous solution including acrylic acid was continuously supplied to a reaction vessel under a condition of maintaining a constant pressure during polymerization. The obtained polymer slurry was dehydrated and dried to obtain a vinylidene fluoride copolymer (VDF/AA copolymer) including a polar group. A total of 4 g of acrylic acid was added, including the initially added amount.

A positive electrode was obtained in the same manner as in Example 3 with the exception that in the binder composition of the electrode mixture, the VDF/AA copolymer was used as the first copolymer, and the VDF/CTFE copolymer was used as the second copolymer.

Example 5

Amounts of 1040 g of ion-exchanged water, 0.8 g of methyl cellulose, 2 g of diisopropyl peroxy dicarbonate, 396 g of vinylidene fluoride, and 4 g of monomethyl maleate (vinylidene fluoride:monomethyl maleate=100:1.01) were added to an autoclave with an internal volume of 2 liters, and suspension polymerization was performed at 28° C. After polymerization was completed, the polymer slurry was dehydrated, the dehydrated polymer slurry was washed with water, and the polymer slurry was once again dehydrated, after which the mixture was dried for 20 hours at 80° C. to obtain a vinylidene fluoride copolymer (VDF/MMM copolymer).

A positive electrode was obtained in the same manner as in Example 3 with the exception that in the binder composition of the electrode mixture, the VDF/MMM copolymer was used as the first copolymer, and the VDF/CTFE copolymer was used as the second copolymer.

Example 6

Amounts of 1000 g of ion-exchanged water as a dispersing medium, 0.22 g of Metolose SM-100 (available from Shin-Etsu Chemical Co., Ltd.) as a cellulose-based suspension agent, 2.6 g of a 50 wt. % diisopropyl peroxy dicarbonate HFE-347pc-f solution as a polymerization initiator, 413 g of vinylidene fluoride, and 17 g of CTFE were charged in an autoclave with an internal volume of 2 liters, and the temperature was increased to 28° C. over a period of 1 hour. While the temperature was maintained at 28° C., 108 g of a 2 wt. % acryloyloxy propyl succinate aqueous solution was added over 10 hours beginning at 5 hours from the startup of the temperature increase. The polymerization was stopped when the internal pressure inside the reaction vessel reached 1.6 MPa-G, and polymerization was performed for 32 hours from the startup of the temperature increase. After polymerization was ended, the polymer slurry was heat treated at 95° C. for 60 minutes, then dehydrated, washed with water, and dried at 80° C. for 20 hours, and thereby a vinylidene fluoride copolymer (VDF/CTFE/APS copolymer) including a polar group was obtained.

A positive electrode was obtained in the same manner as in Example 3 with the exception that in the binder composition of the electrode mixture, the VDF/APS copolymer was used as the first copolymer, and the VDF/CTFE/APS copolymer was used as the second copolymer.

Example 7

Amounts of 1096 g of ion-exchanged water, 0.4 g of Metolose 90SH-100 (available from Shin-Etsu Chemical Co., Ltd.), 2.2 g of a 50 wt. % diisopropyl peroxy dicarbonate-freon 225 cb solution, 426 g of vinylidene fluoride, and an initial addition amount of 0.2 g of carboxyethyl acrylate were charged in an autoclave with an internal volume of 2 liters, and the temperature was increased to 45° C. over a period of 2 hours. Subsequently, a 6 wt. % carboxyethyl acrylate aqueous solution was gradually added at a rate of 0.5 g/minute while the temperature was maintained at 45° C. The obtained polymer slurry was dehydrated and dried to obtain a vinylidene fluoride copolymer (VDF/CEA) including a polar group. A total of 4.0 g of carboxyethyl acrylate was added, including the amount initially added.

A positive electrode was obtained in the same manner as in Example 3 with the exception that in the binder composition of the electrode mixture, the VDF/CEA copolymer was used as the first copolymer, and the VDF/CTFE copolymer was used as the second copolymer.

Comparative Example 1

A positive electrode was obtained in the same manner as in Example 1 with the exception that with respect to the electrode mixture, the VDF/CTFE copolymer was set to 100 wt. %.

Comparative Example 2

A positive electrode was obtained in the same manner as in Comparative Example 1 with the exception that with respect to the electrode mixture, KF #7200 (PVDF) available from Kureha Corporation was set to 100 wt. %.

Comparative Example 3

A positive electrode was obtained in the same manner as in Example 3 with the exception that with respect to the electrode mixture, #7200 (PVDF) available from Kureha Corporation was used as a first polymer, and a VDF/CTFE copolymer was used as a second copolymer.

Comparative Example 4

A positive electrode was obtained in the same manner as in Example 1 with the exception that with respect to the electrode mixture, the VDF/APS copolymer was set to 100 wt. %.

The electrode active material, the pH of the electrode mixture layer, the slurry viscosity of the electrode mixture, and the peel test results for the electrodes produced using the electrode mixtures are shown in Tables 1 and 2 for each of the examples and comparative examples.

TABLE 1

| | | pH | | Binder | | Blend ratio wt. % | | Binder inherent viscosity dL/g | |
|---|---|---|---|---|---|---|---|---|---|
| | Positive electrode | Electrode active material | Electrode mixture layer | First copolymer | Second copolymer | First copolymer | Second copolymer | First copolymer | Second copolymer |
| Example 1 | NCA811 | 11.5 | 11.4 | VDF/APS Copolymer | VDF/CTFE Copolymer | 90 | 10 | 2.6 | 2.1 |
| Example 2 | NCA811 | 11.5 | 11.3 | VDF/APS Copolymer | VDF/CTFE Copolymer | 75 | 25 | 2.6 | 2.1 |
| Example 3 | NCA811 | 11.5 | 11.4 | VDF/APS Copolymer | VDF/CTFE Copolymer | 50 | 50 | 2.6 | 2.1 |

TABLE 1-continued

| | Positive electrode | pH Electrode active material | pH Electrode mixture layer | Binder First copolymer | Binder Second copolymer | Blend ratio wt. % First copolymer | Blend ratio wt. % Second copolymer | Binder inherent viscosity dL/g First copolymer | Binder inherent viscosity dL/g Second copolymer |
|---|---|---|---|---|---|---|---|---|---|
| Example 4 | NCA811 | 11.5 | 11.3 | VDF/AA Copolymer | VDF/CTFE Copolymer | 50 | 50 | 2.5 | 2.1 |
| Example 5 | NCA811 | 11.5 | 11.4 | VDF/MMM Copolymer | VDF/CTFE Copolymer | 50 | 50 | 2.1 | 2.1 |
| Example 6 | NCA811 | 11.5 | 11.4 | VDF/APS Copolymer | VDF/CTFE/APS Copolymer | 50 | 50 | 2.6 | 2.5 |
| Example 7 | NCA811 | 11.5 | 11.3 | VDF/CEA Copolymer | VDF/CTFE Copolymer | 50 | 50 | 3.1 | 2.1 |
| Comparative Example 1 | NCA811 | 11.5 | 11.4 | — | VDF/CTFE Copolymer | — | 100 | — | 2.1 |
| Comparative Example 2 | NCA811 | 11.5 | 11.4 | — | PVDF | — | 100 | — | 2.1 |
| Comparative Example 3 | NCA811 | 11.5 | 11.3 | PVDF | VDF/CTFE Copolymer | 50 | 50 | 2.1 | 2.1 |
| Comparative Example 4 | NCA811 | 11.5 | 11.3 | VDF/APS Copolymer | — | 100 | — | 2.6 | — |

TABLE 2

| | Slurry viscosity mPas After 0 hours | Slurry viscosity Viscosity increase change rate (%) After 0 hours | Slurry viscosity mPas After 24 hours | Slurry viscosity Viscosity increase change rate (%) After 24 hours | Slurry viscosity mPas After 96 hours | Slurry viscosity Viscosity increase change rate (%) After 96 hours | Peel test gf/mm After 0 hours | Peel test Peel strength change rate (%) After 0 hours | Peel test gf/mm After 24 hours | Peel test Peel strength change rate (%) After 24 hours | Peel test gf/mm After 96 hours | Peel test Peel strength change rate (%) After 96 hours |
|---|---|---|---|---|---|---|---|---|---|---|---|---|
| Example 1 | 19375 | 100 | 9500 | 49 | 7625 | 39 | 10.52 | 100 | 10.15 | 96 | 10.21 | 97 |
| Example 2 | 20625 | 100 | 23125 | 119 | 32500 | 168 | 9.3 | 100 | 10.15 | 109 | 10.21 | 110 |
| Example 3 | 18375 | 100 | 20375 | 111 | 31125 | 169 | 7.93 | 100 | 8.79 | 111 | 8.78 | 111 |
| Example 4 | 18750 | 100 | 8500 | 45 | 10875 | 58 | 9.21 | 100 | 7.41 | 80 | 7.08 | 77 |
| Example 5 | 12000 | 100 | 6375 | 53 | 14500 | 121 | 6.53 | 100 | 7.27 | 111 | 6.96 | 107 |
| Example 6 | 23625 | 100 | 23750 | 101 | 40750 | 172 | 9.63 | 100 | 9.63 | 100 | 9.47 | 98 |
| Example 7 | 19838 | 100 | 8993 | 45 | 11506 | 58 | 9.94 | 100 | 8.00 | 80 | 7.65 | 77 |
| Comparative Example 1 | 13000 | 100 | 6625 | 51 | 6625 | 51 | 2.05 | 100 | 2.06 | 100 | 3.28 | 160 |
| Comparative Example 2 | 6875 | 100 | Gelling measurement not possible. | — | Gelling measurement not possible. | — | 7.15 | 100 | Gelling measurement not possible. | — | Gelling measurement not possible. | — |
| Comparative Example 3 | 18125 | 100 | 11625 | 64 | 11125 | 61 | 2.35 | 100 | 4.14 | 176 | 4.45 | 189 |
| Comparative Example 4 | 17250 | 100 | 6000 | 35 | Gelling measurement not possible. | — | 12.2 | 100 | 10.9 | 89 | Gelling measurement not possible. | — |

INDUSTRIAL APPLICABILITY

The electrode mixture of the present invention can be suitably used as a material for producing a positive electrode of a lithium-ion secondary battery.

REFERENCE SIGNS LIST

1 Positive electrode
2 Negative electrode
3 Separator
5 Metal casing
10 Electrode structure
11 Current collector
12*a*, 12*b* Electrode mixture layer

The invention claimed is:

1. An electrode mixture comprising:
   an electrode active material provided on a current collector; and
   a binder composition for binding the electrode active material to the current collector, wherein
   the binder composition comprises a first copolymer of vinylidene fluoride and a polar group-containing compound; and a second copolymer of vinylidene fluoride and chlorotrifluoroethylene,
   a compounding ratio of the first copolymer and the second copolymer comprised in the binder composition is from 90:10 to 50:50 in terms of a mass ratio,
   the electrode active material comprises a lithium metal oxide, and a pH of the electrode active material is not less than 10.5, the pH of the electrode active material determined by extracting the lithium metal oxide with water, wherein the lithium metal oxide is a binary lithium metal oxide represented by Formula (2):

$$LiNi_xN1_yO_2 \qquad (2)$$

where N1 represents Co or Mn, $0.5 \leq x \leq 1$, and $0 < y \leq 0.5$, or a ternary lithium metal oxide represented by Formula (3):

$$LiNi_xCo_yN2_zO_2 \qquad (3)$$

where N2 represents either Mn or Al, $0.5 \leq x \leq 1$, $0 < y \leq 0.5$, and $0 < z \leq 0.5$.

2. The electrode mixture according to claim 1, wherein the first copolymer comprises from 90.00 to 99.99 mol % of vinylidene fluoride units, and the second copolymer comprises from 70.00 to 99.50 mol % of vinylidene fluoride units (based on the total of the vinylidene fluoride units; and constituent units derived from the polar group-containing compound or the chlorotrifluoroethylene being 100.00 mol %).

3. The electrode mixture according to claim 1, wherein the polar group-containing compound comprises a carboxyl group.

4. The electrode mixture according to claim 1, wherein the polar group-containing compound is acrylic acid, an acrylic acid derivative, or an unsaturated dibasic acid monoester.

5. A method for producing an electrode mixture, the method comprising kneading:

a first copolymer obtained by copolymerizing vinylidene fluoride and a polar group-containing compound;

a second copolymer obtained by copolymerizing vinylidene fluoride and chlorotrifluoroethylene; and a lithium metal oxide, wherein a compounding ratio of the first copolymer and the second copolymer is from 90:10 to 50:50 in terms of a mass ratio, a pH of the lithium metal oxide is not less than 10.5, the pH of the lithium metal oxide determined by extracting the lithium metal oxide with water, and the lithium metal oxide is a binary lithium metal oxide represented by Formula (2):

$$LiNi_xN1_yO_2 \qquad (2)$$

where N1 represents Co or Mn, $0.5 \leq x \leq 1$, and $0 < y \leq 0.5$, or a ternary lithium metal oxide represented by Formula (3):

$$LiNi_xCo_yN2_zO_2 \qquad (3)$$

where N2 represents either Mn or Al, $0.5 \leq x \leq 1$, $0 < y \leq 0.5$, and $0 < z \leq 0.5$.

6. An electrode structure comprising:

a current collector; and an electrode mixture layer provided on the current collector, wherein the electrode mixture layer comprises at least a binder composition and an electrode active material, the binder composition comprises a first copolymer of vinylidene fluoride and a polar group-containing compound; and a second copolymer of vinylidene fluoride and chlorotrifluoroethylene, a compounding ratio of the first copolymer and the second copolymer comprised in the binder composition is from 90:10 to 50:50 in terms of a mass ratio, the electrode active material comprises a lithium metal oxide, and a pH of the electrode active material is not less than 10.5, the pH of the electrode active material determined by extracting the electrode active material with water, and the lithium metal oxide is a binary lithium metal oxide represented by Formula (2):

$$LiNi_xN1_yO_2 \qquad (2)$$

where N1 represents Co or Mn, $0.5 \leq x \leq 1$, and $0 < y \leq 0.5$, or a ternary lithium metal oxide represented by Formula (3):

$$LiNi_xCo_yN2_zO_2 \qquad (3)$$

where N2 represents either Mn or Al, $0.5 \leq x \leq 1$, $0 < y 0.5$, and $0 < z \leq 0.5$.

7. A method for producing the electrode structure described in claim 6, the method comprising:

applying and drying an electrode mixture comprising the binder composition, the lithium metal oxide, and a solvent onto a surface of the current collector to form a coating film on the surface of the current collector; and heat treating the coating film to obtain the electrode mixture layer.

8. A secondary battery comprising the electrode structure described in claim 6.